Patented Nov. 11, 1952

2,617,836

UNITED STATES PATENT OFFICE 2,617,836

PRODUCTION OF OLEFINIC C₄F₈

Wilbur H. Pearlson, Bald Eagle, White Bear Township, Ramsey County, and Lyle J. Hals, St. Paul, Minn., assignors to Minnesota Mining & Manufacturing Company, St. Paul, Minn., a corporation of Delaware No Drawing. Application April 18, 1951,
Serial No. 221,738

2 Claims. (Cl. 260—653)

This application is based upon, and constitutes a mere amplification of, our prior application Serial No. 163,332, filed May 20, 1950.

The present invention relates to compounds containing carbon and fluorine. More particularly it relates to an improved method of making a particular fluorocarbon compound, namely olefinic $C_4F_8$.

Heretofore certain unsaturated fluorocarbons have been prepared by first producing chlorofluoro-carbon compounds and then by the use of a suitable reagent removing chlorine atoms from adjacent carbon atoms; thus yielding an unsaturated compound. Still others have produced certain olefinic fluorocarbons by removal of HCl from chloro-fluoro-carbon hydrides.

Although it does not concern our process or involve any teaching of the production of olefinic $C_4F_8$, Benning et al. Patent No. 2,394,581 is referred to as a matter of general interest in this general field of chemistry.

We have found that we can produce olefinic $C_4F_8$, and more particularly perfluoroisobutene, $(CF_3)_2C=CF_2$, smoothly and in yields appreciably above 50% of the theoretical by the controlled pyrolysis of the cyclic $C_4F_8$ compound, octafluorocyclobutane. The method of carrying out our process will now be illustrated by a specific example.

Example

As apparatus we employed a carbon tube of ½" internal diameter, enclosed in ¾" iron pipe and heated over a 14" section by an electric furnace. The cyclic $C_4F_8$ (B. P. about −4° C.) was introduced into the carbon tube as a gas and passed through the heated section thereof. The products leaving the heated zone were condensed in traps cooled by liquid air. Temperatures were determined by a thermocouple placed between the iron casing and the furnace wall. Maintaining the temperature, at the point of the thermocouple, at 700–725° C., we introduced gaseous cyclic $C_4F_8$ into the carbon tube at such rate that 7.4 grams of the cyclic $C_4F_8$ were introduced and passed through the carbon tube during the period of about 15 minutes. Examination of the reaction product, condensed in the traps, showed that about 90% of the material had been pyrolyzed. The products were further analyzed by means of the infrared spectrum. Approximately 70% of the product was olefinic $C_4F_8$, having a boiling point of about +5 to +6° C. at 740 mm. Another 20% of the product was shown to be unsaturated $C_3F_6$. The identity of these olefins is specifically established by the characteristic infrared data for the C=C stretching frequency at 1798 cm.⁻¹ in the case of the $C_3F_6$ olefin and at 1750 cm.⁻¹ in the case of the $C_4F_8$ olefin. It should be noted that perfluorobutene-1 has its bond at 1795 cm.⁻¹, as do the other terminal straight chain olefins.

The $C_4F_8$ olefinic product was further identified by molecular weight determination. The molecular weight found was 200; whereas the molecular weight by calculation is also 200.

Oxidation of the $C_4F_8$ olefin product by aqueous neutral $KMnO_4$ yielded perfluoro-acetone,

proving beyond doubt that the $C_4F_8$ olefin is the isomer, perfluoroisobutene, $(CF_3)_2C=CF_2$. 26.4 g. of $i-C_4F_8$, B. P. +6.4° C., 35 g. $KMnO_4$ and 50 g. of water were heated in a metal bomb to about 100° C. for a total of 4 hours and then cooled to room temperature. The low boiling gases were bled off and collected in a liquid air cooled trap. The ketone, $(CF_3)_2CO$, i. e., the perfluoroacetone, was recovered from the aqueous reaction mixture by filtering off the solid manganese dioxide, destroying the excess permanganate with sodium bisulfite, and then extracting the ketone as the hydrate with ether. The ketone hydrate was concentrated in the resultant extract by distillation of the ether. The ketone was then liberated by treatment of the resulting concentrated hydrate with phosphorous pentoxide.

The ketone was found to boil at −26° C./747 mm. and to have a mol. wt. of 163–168. The calculated molecular weight for $C_3F_6O$ is 166. The reported boiling point for the ketone $(CF_3)_2CO$, is −26° C. The infrared spectrum of the ketone matches that of an authentic sample of the compound.

The conversion was 32%, the yield 31%.

Some departures from the temperature range of 700–725° C. can be made and are contemplated. However, in spite of variations in charging rate, we have found that 600° C. is too low to provide any significant reaction. On the other hand, if temperatures are increased so that they approach 900° C., this leads to a very marked increase in the production of olefinic $C_3F_6$. In general the reaction temperature should be maintained within a restricted range and should not depart too widely from about 700–725° C. In other words, the reaction temperature should be of the order of 700° C.

What we claim is:

1. A process which comprises passing a gaseous charging stock primarily consisting of octafluorocyclobutane through a heated tube maintained at a temperature of the order of 700° C. and for a time sufficient to cause upwards of 50% conversion to olefinic $C_4F_8$, and recovering the latter.

2. The novel compound, perfluoroisobutene, $(CF_3)_2C=CF_2$.

WILBUR H. PEARLSON.
LYLE J. HALS.

REFERENCES CITED

The following references are of record in the file of this patent:

UNITED STATES PATENTS

| Number | Name | Date |
|---|---|---|
| 2,384,449 | Benning et al. | Sept. 11, 1945 |
| 2,384,821 | Downing et al. | Sept. 18, 1945 |
| 2,394,581 | Benning et al. | Feb. 12, 1946 |
| 2,404,374 | Harmon | July 23, 1946 |
| 2,406,153 | Lewis | Aug. 20, 1946 |

OTHER REFERENCES

Miller et al., Ind. and Eng. 39, 303, 401, (1947).
Henne et al., J. A. C. S. 70, 130 (1948).